(12) United States Patent
Mayernick et al.

(10) Patent No.: US 7,574,494 B1
(45) Date of Patent: Aug. 11, 2009

(54) USER INTERFACE FOR A BI-DIRECTIONAL COMMUNICATION SYSTEM

(75) Inventors: Mark R. Mayernick, Carmel, IN (US);
Peter P. Polit, Indianapolis, IN (US);
Suresh Natarajan, Bellevue, WA (US);
Brian A. Wittman, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/567,398

(22) Filed: May 9, 2000

Related U.S. Application Data (60) Provisional application No. 60/159,788, filed on Oct. 15, 1999.

(51) Int. Cl.
*G06F 15/177* (2006.01)

(52) U.S. Cl. .................. 709/222; 709/203; 709/217; 709/219; 709/225; 709/229; 709/245

(58) Field of Classification Search .................. 709/203, 709/217, 219, 228, 229, 224, 222, 225, 245
See application file for complete search history.

(56) References Cited

U.S. PATENT DOCUMENTS

| | | | | |
|---|---|---|---|---|
| 5,471,190 A | * | 11/1995 | Zimmermann | ......... 340/310.11 |
| 5,699,532 A | * | 12/1997 | Barrett et al. | |
| 5,734,831 A | * | 3/1998 | Sanders | |
| 5,790,548 A | | 8/1998 | Sistanizadeh et al. | ....... 370/401 |
| 5,809,252 A | | 9/1998 | Beighe et al. | ............... 395/200 |
| 5,887,139 A | | 3/1999 | Madison et al. | |
| 5,892,917 A | * | 4/1999 | Myerson | |

(Continued)

FOREIGN PATENT DOCUMENTS

FR 2760159 8/1998

(Continued)

OTHER PUBLICATIONS

M. St. Johns, Ed., DOCSIS Cable Device MIB *Cable Device Management Information Base for DOCSIS Compliant Cable Modems and Cable Modem Termination Systems*, Aug. 1999, pp. 1-55.

(Continued)

*Primary Examiner*—Michael Won
(74) *Attorney, Agent, or Firm*—Robert D. Shedd; Harvey D. Fried; Joel M. Fogelson (57) ABSTRACT

A system including a modem locally generates a web page based graphical User interface for display to a user on a PC using different standardized browser applications and enabling a User to control or configure system functions. A processing system supports Internet compatible bi-directional communication and employs a method for providing local access to processing system parameters. The method involves receiving a locally initiated User command requesting access to a web page and validating authorization of the User command. The method also involves generating an Internet compatible web page for display containing a system parameter associated with the bi-directional communication in response to the validated User command. The generated web page is locally accessible via a web browser resident in the processing system and supports interactive functions such as, (a) configuring the processing system, (b) requesting display of system parameters, (c) selecting a service billing option, and (d) assigning Internet addresses.

16 Claims, 9 Drawing Sheets

U.S. PATENT DOCUMENTS

| | | | |
|---|---|---|---|
| 5,956,484 A * | 9/1999 | Rosenberg et al. | |
| 5,961,604 A | 10/1999 | Anderson et al. | 709/229 |
| 5,983,214 A * | 11/1999 | Lang et al. | |
| 6,006,265 A | 12/1999 | Rangan et al. | 709/226 |
| 6,012,088 A | 1/2000 | Li et al. | 709/219 |
| 6,012,100 A * | 1/2000 | Frailong et al. | |
| 6,023,724 A * | 2/2000 | Bhatia et al. | 709/218 |
| 6,125,385 A * | 9/2000 | Wies et al. | |
| 6,266,664 B1 * | 7/2001 | Russell-Falla et al. | 707/5 |
| 6,304,909 B1 * | 10/2001 | Mullaly et al. | |
| 6,308,205 B1 * | 10/2001 | Carcerano et al. | |
| 6,381,638 B1 * | 4/2002 | Mahler et al. | 709/220 |
| 7,139,811 B2 * | 11/2006 | Lev Ran et al. | 709/217 |
| 7,254,642 B2 * | 8/2007 | Bhogal et al. | 709/245 |

FOREIGN PATENT DOCUMENTS

GB    2333670    7/1999

OTHER PUBLICATIONS

PCT Search Report, Jul. 26, 2001.

\* cited by examiner

RCA DIGITAL CABLE MODEM - GRANT ACCESS

PLEASE ENTER: USERID ▢

PASSWORD ▢

[OK] [START OVER] [CANCEL]

FIG. 9

RCA DIGITAL CABLE MODEM - CHANGE PASSWORD

OLD PASSWORD: ▢

NEW PASSWORD: ▢

NEW PASSWORD (CONFIRM): ▢

[OK] [START OVER] [CANCEL]

FIG. 10

RCA DIGITAL CABLE MODEM - ACCESS DENIED (INCORRECT PW/USERID)

[OK] [TRY AGAIN] [CANCEL]

USER INTERFACE FOR A BI-DIRECTIONAL COMMUNICATION SYSTEM

This is a non-provisional application of provisional application Ser. No. 60/159,788 by M. Mayernick et al., filed Oct. 15, 1999.

FIELD OF THE INVENTION

This invention concerns a system and User interface suitable for use in an interactive bi-directional communication such as a cable modem, computer, TV, VCR, set top box or an associated peripheral device.

BACKGROUND OF THE INVENTION

Home entertainment systems increasingly include both Personal Computer and television functions (PC/TV functions) involving multiple source and multiple destination communication. Such a system may receive data from satellite or terrestrial sources comprising High Definition Television (HDTV) broadcasts, Multi-point Microwave Distribution System (MMDS) broadcasts and Digital Video Broadcasts (DVB). Such a system may also provide high speed Internet access through a broadcast link or a coaxial link (e.g. cable TV lines) using a cable modem or via a telephone line link using an ADSL or ISDN (Asynchronous Digital Subscriber Line or Integrated Services Digital Network) compatible modem, for example. A home entertainment system may also communicate with local sources such as Digital Video Disk (DVD), CDROM, VHS, and Digital VHS (DVHS™) type players, PCs, set top boxes and many other types of sources.

It is desirable for a home entertainment system supporting Internet compatible bi-directional communication using cable and other types of modems to be able to provide security and flexibility of operation. Specifically, it is desirable to provide a secure User interface preventing unauthorized Internet access and supporting complex User interactive tasks whilst providing a simple command interface suitable for the general public. It is further desirable to provide User flexibility in configuring home entertainment communication functions and in allocating Internet domain names (e.g. Universal Resource Locators—URLs) to manage and access elements and peripherals of a home entertainment system and to support Internet applications. Such applications may involve devices including video receivers, audio receivers, VCRs, DVDs, PCs, printers, scanners, copiers, telephones, fax machines and home appliances that are operated in stand alone mode or in a domestic (or other) intra-net, for example. These problems and derivative problems are addressed by a system according to the present invention.

SUMMARY OF THE INVENTION

A system including a modem locally generates a web page based graphical User interface for display to a user on a PC using different standardized browser applications and enabling a User to control or configure system functions. A processing system supports Internet compatible bi-directional communication and employs a method for providing local access to processing system parameters. The method involves receiving a locally initiated User command requesting access to a web page and validating authorization of the User command. The method also involves generating an Internet compatible web page for display containing a system parameter associated with the bi-directional communication in response to the validated User command. The generated web page is locally accessible via a web browser resident in the processing system.

DETAILED DESCRIPTION OF THE DRAWINGS

Figure 1:
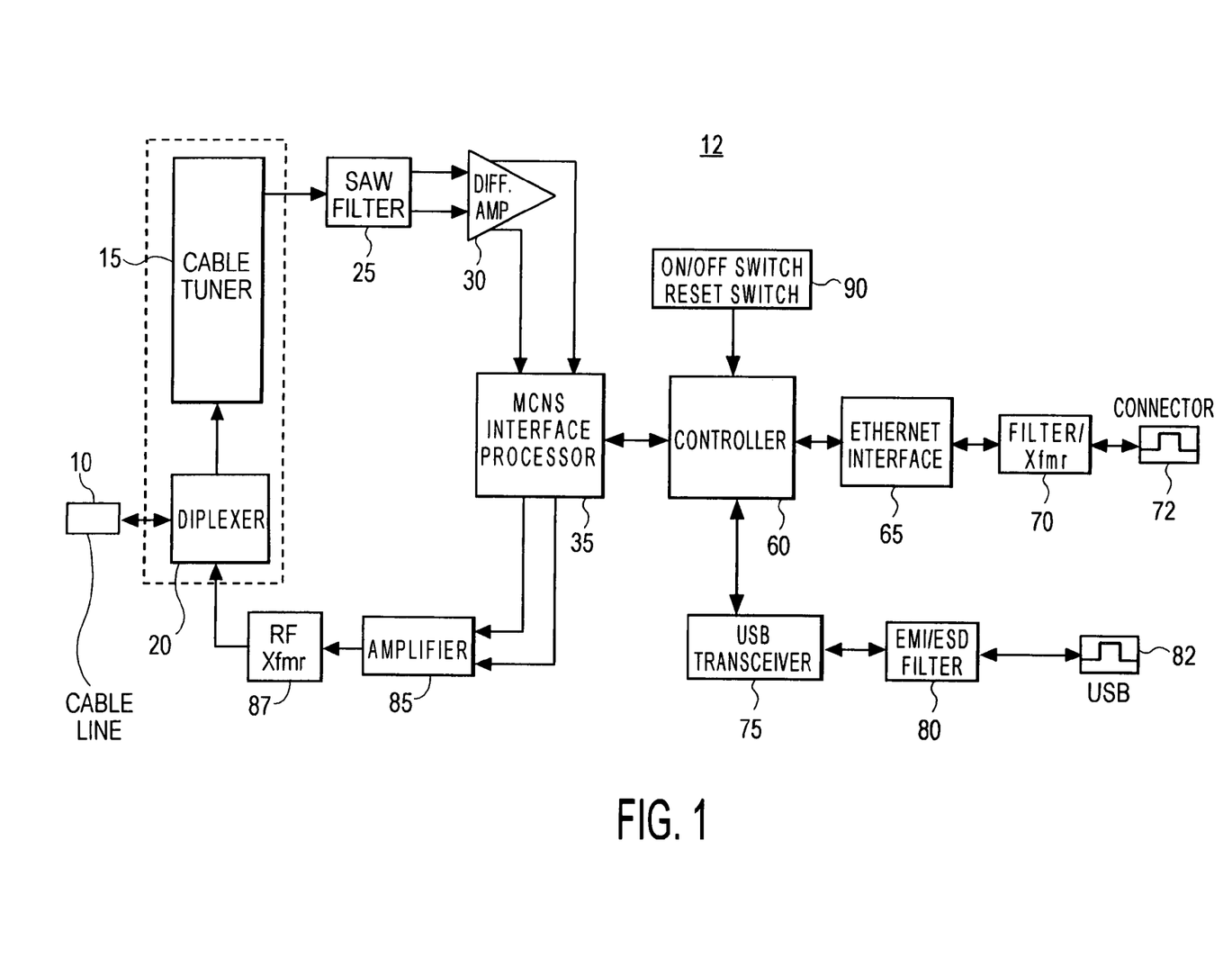
FIG. 1 shows a cable modem system, according to the invention.

FIG. 1 shows a cable modem system that advantageously prevents unauthorized Internet access by providing a User with the capability of locking and unlocking the modem's Internet communication function. The cable modem system also incorporates a Domain Name Snoop Server (DNSS) for advantageously intercepting Domain Name resolution requests and for translating a domain name to a corresponding Internet compatible web page address. In support of these and other features, the modem advantageously generates a web page based graphical user interface for display to a user on a PC using different standardized browser applications. These modem features address the problems of preventing unauthorized Internet access and providing User flexibility in allocating Internet domain names to manage and access elements and peripherals of a home (or other) intra-net system using a simple command interface suitable for the general public.

The exemplary embodiment of system 12 of FIG. 1 supports cable modem bridging communication between a remote CATV head-end and local area network (LAN) devices, e.g. a PC, that are local to the cable modem. The bi-directional communications between system 12 and the CATV head-end are in a multi-layered protocol format. This multi-layered protocol format involves a QAM (Quadrature Amplitude Modulation) or QPSK (Quadrature Phase Shift Keying Modulation) physical layer. This physical layer conveys MPEG2 (Moving Pictures Expert Group) transport protocol data conveying DOCSIS MAC (Media Access Control) data frames. The MAC data conveys Ethernet data frames or MAC management data and the Ethernet data in turn conveys IP layer data. The cable modem also maintains a return communication path to the CATV head-end employing Time Division Multiplexed communication of return data in Ethernet protocol.

The encompassing physical layer data transmitted from the CATV head-end to the cable modem is processed and converted to Ethernet or USB format for communication to LAN devices attached to corresponding Ethernet or USB ports. The cable modem maintains bi-directional communication with the LAN devices and also receives data from the devices in corresponding Ethernet or USB protocol. The bi-directional communications between system 12 and the Ethernet compatible or USB compatible devices (attached to ports 72 and 82 of system 12) involve a multi-layered protocol format in similar fashion to the communication between the CATV head-end and system 12. This multi-layered protocol format may include Ethernet/USB frames, HTTP (Hyper Text Transmission Protocol) and TCP/IP (Transmission Control Protocol/Internet Protocol) data and other protocols depending on the applications served.

The cable modem described herein employs an MPEG compatible protocol conforming to the MPEG2 image encoding standard, termed the "MPEG standard". This standard is comprised of a system encoding section (ISO/EEC 13818-1, 10 Jun. 1994) and a video encoding section (ISO/IEC 13818-2, 20 Jan. 1995). The Internet TCP/IP (Transmission Control Protocol/Internet Protocol) and Ethernet compatible protocols described herein provide compatibility with the Multimedia Cable Networks Systems (MCNS) preliminary requirements and DOCSIS 1.0 (Data Over Cable Service Interface Specification 1.0) requirements ratified by the International Telecommunications Union (ITU) March 1998 and as specified in RFC 2669 (Request For Comment Document 2669). Further, the discussion of Domain Name processing herein involves Domain Name Resolution procedures that are documented in RFC 1591 March 1994 and in RFC 1918 February 1996 and other documents. The RFC documents are available via the Internet and are prepared by Internet standards working groups.

The principles of the invention may be applied to any bi-directional communication system and is not restricted to cable, ADSL, ISDN or conventional type modems. Further, although the disclosed system is described as processing web page data for display, this is exemplary only. The term 'web page' is to be interpreted generally to represent any form of data that may be communicated via Internet Protocol (IP) from an Internet source and includes any form of packetized data including streamed video or audio data, telephone messages, computer programs, Emails or other communications, for example.

The cable modem (system 12) of FIG. 1 communicates with a CATV head-end over a bi-directional broadband high speed RF link on line 10 which typically consists of coaxial cable or hybrid fiber/coax (HFC). The modem system 12 bi-directionally communicates with devices located at a User site over local area networks (LANs). Typical User-side local area networks include Digital/Intel/Xerox Ethernet compatible networks attached via connector 72. Other User-side devices communicate via a Universal Serial Bus (USB) compatible network attached via connector 82. User devices attached on the Ethernet and USB networks may include equipment such as personal computers (PCs), network printers, video receivers, audio receivers, VCRs, DVDs, scanners, copiers, telephones, fax machines and home appliances, for example.

In operation, diplexer 20 of cable modem system 12 of FIG. 1 separates upstream communications (sent from modem 12 to a CATV head-end) from downstream communications (sent from a CATV head-end to modem 12) conveyed via cable line 10. Diplexer 20 separates upstream data from downstream data based on the different frequency ranges that the upstream data (typically 5-42 MHz) and downstream data (typically 92-855 MHz) respectively employ. Controller 60 configures the elements of cable modem 12 of FIG. 1 to receive MPEG2 transport data from the CATV head-end on cable line 10 and to convert the data to Ethernet or USB compatible format for output via ports 72 and 82 respectively. Similarly, controller 60 configures the elements of cable modem 12 of FIG. 1 to receive Ethernet or USB compatible data from ports 72 and 82 and to convert and transmit MPEG2 transport protocol data to the CATV head-end on cable line 10. Controller 60 configures the elements of system 12 through the setting of control register values within these elements using a bi-directional data and control signal bus. Specifically, controller 60 configures tuner 15, saw filter 25, differential amplifier 30 and MCNS (Multimedia Cable Networks Systems) interface device 35 to receive a DOCSIS formatted signal on a previously identified RF channel frequency. The DOCSIS formatted signal comprises an MPEG2 transport protocol format conveying Ethernet compatible data frames including IP data content.

Controller 60 employs an initialization process to determine the RF channel frequency that tuner 15 is to be configured to receive. The initialization process involves iteratively tuning to successive candidate RF channel frequencies until a DOCSIS compliant signal is obtained. Controller 60 recognizes a DOCSIS compliant signal on a candidate channel through the successful decode by MCNS interface processor 35 of the received data and through a correspondingly acceptable error rate for the decoded data. In the initialization process, controller 60 in conjunction with MCNS interface 35, amplifier 85 and RF transformer 87, also transmits data upstream to the CATV head-end for a variety of purposes including for adaptively and iteratively adjusting upstream and downstream communication parameters. These parameters include cable modem transmission power level and timing offset, for example.

Following initialization and in normal operation, an RF carrier is modulated with MPEG2 transport protocol data using 64 or 256 QAM (Quadrature Amplitude Modulation). The MPEG2 transport data includes Ethernet formatted data which in turn includes IP data representing a User requested HTML (HyperText Mark-Up Language) web page, for example. The MPEG transport data is provided by diplexer 20 to tuner 15. Tuner 15 down-converts the input signal from diplexer 20 to a lower frequency band which is filtered by saw filter 25 to enhance signal isolation from neighboring RF channels. The filtered signal from unit 25 is level shifted and buffered by differential amplifier 30 to provide a signal compatible with MCNS interface processor 35. The resultant down converted, level-shifted signal from amplifier 30 is demodulated by MCNS processor 35. This demodulated data is further trellis decoded, mapped into byte aligned data segments, deinterleaved and Reed-Solomon error corrected within processor 35. Trellis decoding, deinterleaving and Reed-Solomon error correction are known functions described, for example, in the reference text *Digital Communication*, Lee and Messerschmidt (Kluwer Academic Press, Boston, Mass., USA, 1988). Processor 35 further converts the MPEG2 format data to Ethernet data frames that are provided to processor 60.

Processor 60 parses and filters the Ethernet compatible data from unit 35 using filters configured from the CATV head-end. The filters implemented by processor 60 match IP data identifiers in incoming Ethernet frame packets provided by unit 35 with IP identifier values pre-loaded from the CATV head-end. The IP identifier values are pre-loaded during a previously performed initialization or configuration operation. By this means processor 60 implements a data admission control function forwarding selected data to local LAN devices and discarding other selected data content. This configurable filter system may be advantageously used to filter data based on metadata items in the incoming data for a variety of purposes including based on, (a) content rating for parental or other blocking control, (b) predetermined User preferences for targeting advertisements and "push-content", (c) firewall filtering, (d) identity of source, and (e) a data search function. The filtered Ethernet compatible serial data is communicated to a PC via Ethernet interface 65, filter and isolation transformer 70 and port 72. Interface 65 buffers and conditions the data from processor 60 for filtering and transforming by unit 70 for output to a PC via port 72.

In similar fashion, controller 60 converts and filters IP data (conveyed in Ethernet data frames) from processor 35 for output in USB format via port 82. The USB data is buffered by transceiver 75 and filtered by noise and interference suppression (EMI/ESD) filter 80 prior to output to USB compatible LAN devices connected to port 82.

Modem system 12 also communicates data upstream from an attached PC, for example, to a CATV head-end. For this purpose, controller 60 of system 12 receives Ethernet compatible data from the attached PC via port 72, interface 65 and filter/isolation transformer 70 and provides it to processor 35. Processor 35 modulates an RF carrier with the received Ethernet format data using 16 QAM or QPSK (Quadrature Phase Shift Keying Modulation). The resultant modulated data is time division multiplexed onto cable line 10 for upstream communication via amplifier 85, transformer 87 and diplexer 20. Amplifier 85 outputs the data to the CATV head-end with an appropriate power level selected in the previously described initialization process. Transformer 87 provides a degree of fault and noise isolation in the event of a failure in the modem 12 or upon the occurrence of locally generated noise in the modem or in attached devices.

In similar fashion, modem system 12 also communicates data upstream from devices attached via USB port 82. In an exemplary implementation, controller 60 of system 12 receives Ethernet compatible data from transceiver 75 and provides it to processor 35 for upstream communication in the manner previously described. For this purpose, transceiver 75 receives Ethernet data encapsulated within USB frames from port 82 via filter 80 and removes the USB frame data to provide Ethernet format data to controller 60.

Controller 60 is also responsive to on/off and reset switch 90 and performs a variety of functions in addition to those already described. Specifically, modem 12 under the direction of controller 60 advantageously, (a) enables a User to lock the modem and prevent unauthorized Internet access, (b) supports interception of Domain Name resolution requests and the translation of a domain name to a corresponding Internet compatible web page address, (c) enables the allocation of Internet domain names for usage in a home, private Internet or other intra-net system independently of the public Internet, and (d) generates interactive HTML web pages as a graphical User interface. In addition, controller 60 configures modem 12 parameters using configuration information provided from a CATV head-end. Controller 60 also directs system 12 in synchronizing and multiplexing upstream communication onto cable line 10 and implements a rate limit in controlling upstream data traffic. Further, controller 60 bi-directionally filters received data and provides selected data to either the CATV head-end and LAN devices attached to ports 72 and 82. Controller 60 also maintains a TCP/IP data stack for buffering and data management purposes and supports data ranging communication with the CATV head-end.

The ranging communication is initiated by the CATV head-end and comprises the continuous but intermittent polling of individual modems to determine status and to identify modem or line failures.

Figure 2:
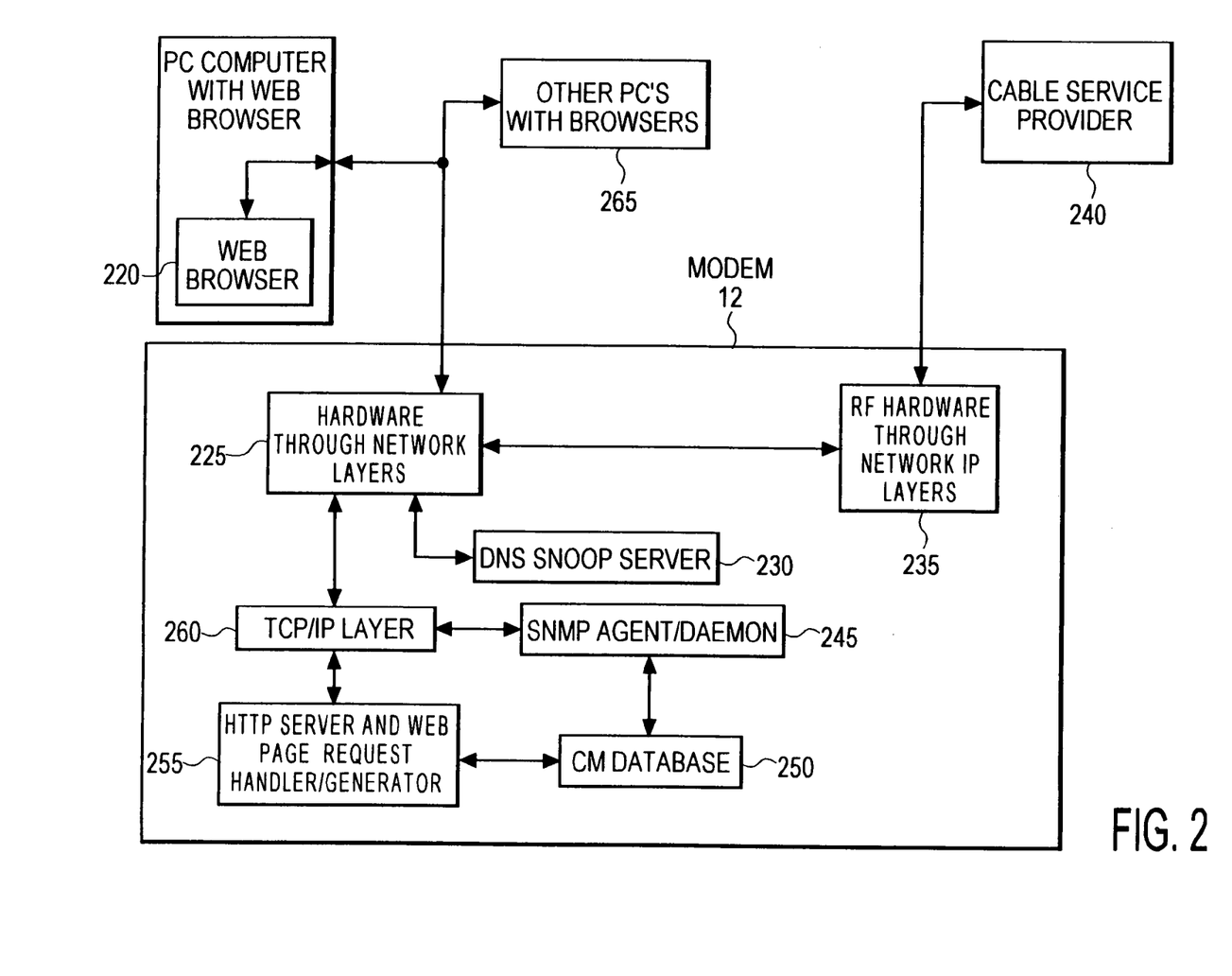
FIG. 2 shows a functional depiction of the cable modem in a network environment with multiple PCs and a cable TV system head-end, according to the invention.

FIG. 2 shows a functional depiction of the cable modem of FIG. 1 in a network environment including multiple PCs and a CATV head-end. The functional elements of FIG. 2 shown within system 12 are executed by controller 60 (FIG. 1) in conjunction with the remaining system 12 elements depicted in FIG. 1. In FIG. 2, Cable modem 12 provides bi-directional bridging communication between a cable service provider 240 at a head-end and LAN connected PCs 220 and 265. In system 12, bi-directional bridging communication between different input and output protocols is provided by interface and protocol conversion functions 225 and 235. The bi-directional communication path provided by units 225 and 235 supports protocol conversion in a multi-layered protocol structure. As previously described in connection with FIG. 1, the protocol layers involve hierarchical MPEG2, Ethernet, and IP protocol layers as well as a USB protocol layer and a QAM or QPSK modulation physical layer. In addition, a TCP/IP stack 260 buffers request and response message data for web page generator, server and management function 255 and SNMP (Simple Network Management Protocol) communication function 245. Further, both the SNMP communication function 245 and the web page manager function 255 employ modem database 250 in responding to commands.

The SNMP function 245 receives and interprets SNMP communications from the CATV head-end 240 and manages the operation of system 12 in response to these communications. Specifically, function 245 configures modem 12 and updates system parameters using configuration information provided from the CATV head-end. Function 245 also configures bi-directional filters in system 12 for parsing and either forwarding, re-directing or discarding received messages from PCs 220, 265 and CATV head-end 240. Function 245 also supports the previously described ranging communication function initiated by head-end 240 for continuous polling of modem 12 to determine the modem status and operational condition.

Web page generator function 255 generates interactive HTML web pages as exemplified in FIGS. 12 and 13 discussed later. The generated web pages comprise a graphical User interface enabling a technician to readily perform diagnostic tests on system 12 and the associated networks. Function 255 generates HTML web pages for display on an attached User's PC 220, for example, allowing a technician to determine faults and status directly through the User's PC. A generated web page may also be remotely accessed following a password and userid authorization procedure with a remote PC using SNMP or another protocol. The generated web pages enable an authorized User to prevent unauthorized Internet access by providing a User with the capability of locking and unlocking the modem's Internet communication function. The generated web pages also provide a User interface enabling viewing and/or update of system parameters and received data such as security alerts, special events (promotions etc.), network traffic statistics and underflow or overflow conditions and data transfer statistics. The web pages also provide diagnostic, billing, status, internal configuration and other information and enable modem configuration change. In another embodiment, the functions performed by the generated web pages that are described herein may be incorporated within a web browser page.

The web pages generated by function 255 also provide an interface enabling a User to allocate an Internet domain name to a private Internet (versus the public Internet). The interface, for example, enables a User to allocate an Internet domain name to an element in a home (or other) intra-net system. For this purpose an intercepting Domain Name Snoop Server (DNSS) 230 supports interception of Domain Name resolution requests generated by PC 220 in response to a User Internet web page request initiated via a browser running on PC 220, for example. The DNSS 230 translates the intercepted domain name to a corresponding private Internet web page address thereby enabling private Internet domain names to be allocated via the generated web pages for usage in a home or other private Internet or intra-net system and independently of the public Internet.

Figure 3:
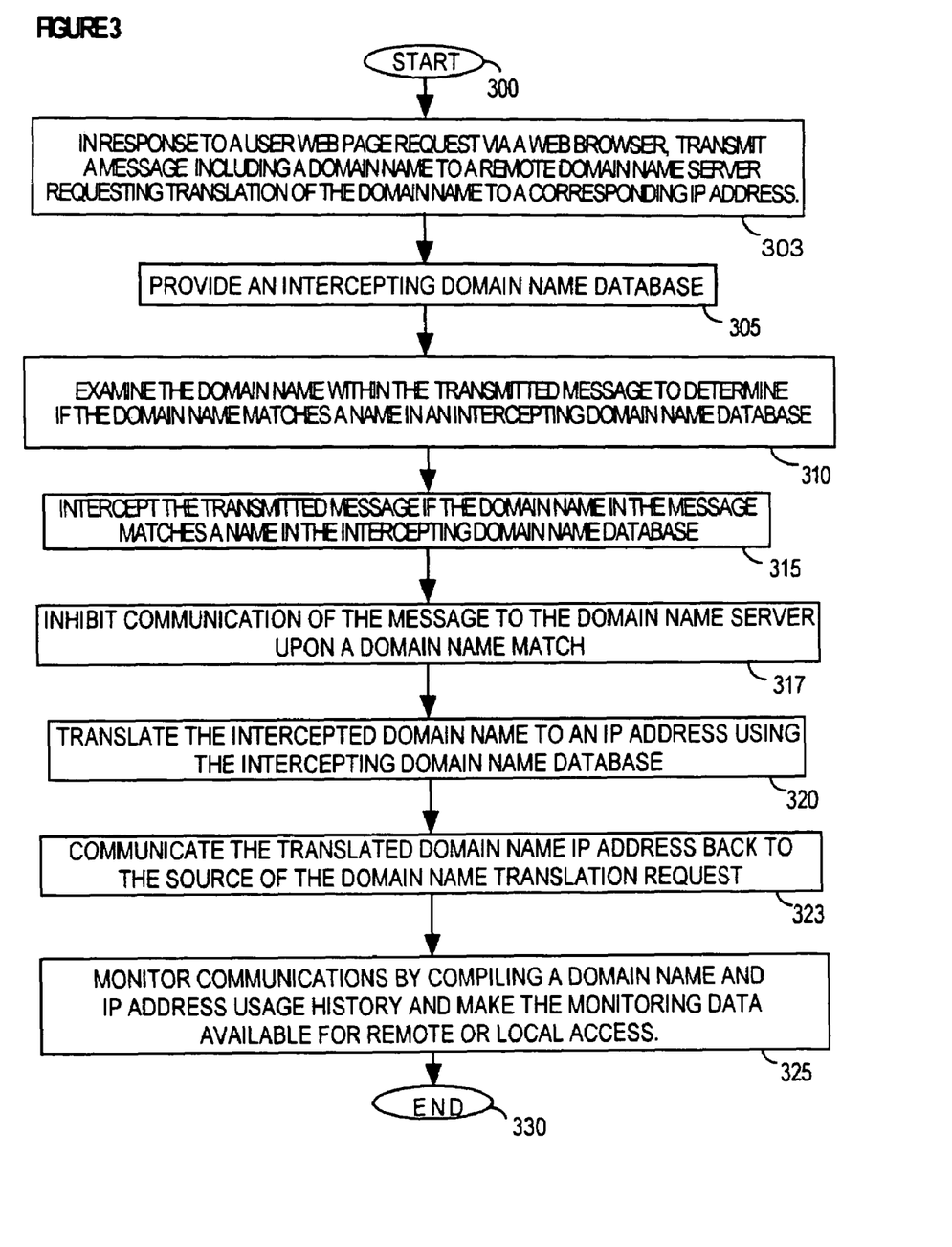
FIG. 3 shows a flowchart of a method for translating a domain name to a corresponding Internet compatible web page address, according to the invention.

FIG. 3 shows a flowchart of a method for translating a domain name to a corresponding Internet compatible web page address. The method is employed by controller 60 of FIG. 1 (in conjunction with the other elements of system 12 of FIGS. 1 and 2) to enable private Internet domain names to be allocated via a generated web page for usage in a home or other private intra-net system. Following the start at step 300, PC 220 (FIG. 2) in step 303 (FIG. 3) transmits a Domain Name Resolution request to system 12 (FIG. 2) in response to a User web page request via a browser running on PC 220. The PC 220 browser submits a Domain Name Request following standard Internet resolution protocols as detailed the RFC (Request For Comment) documents available on the Internet e.g. RFC 1035, 1591, 1816 as well as subsequent and earlier RFCs associated with these documents.

An Internet Domain Name Resolution request is responded to by a Domain Name Server (DNS) used in resolving domain names to IP addresses. Requests are submitted by a resolver to one or more DNS's to get the full IP address of a particular machine or device. For example, on a web browser a User may type RCA.com. This is then sent to a DNS which may translate it to IP address 157.254.235.215. A web browser uses this IP address to contact the web server and retrieve web page information. Note that this example is extremely simplified. In practice, several hierarchically organized DNS's are used via a referral or recursion process, plus many other processes are involved including caching and age factor processing.

The Domain Name Resolution request is submitted by PC 220 to system 12 for forwarding and translation of the Domain Name entered by the User into a corresponding IP address of the source of the requested web page. In step 305, an Intercepting Domain Name database (unit 250 of FIG. 2) is provided for use within system 12. The intercepting Domain Name database associates IP addresses with Domain Names of intra-net devices on a domestic LAN (a private intra-net) and is derived from Domain Names and IP address information locally allocated by a User via a web page interface generated by system 12. Alternatively, the intercepting Domain Name database may be downloaded using DHCP (Dynamic Host Configuration Protocol) from a remote Internet location e.g. from the CATV head-end. In another embodiment, the intercepting Domain Name database may be downloaded from local Internet location e.g. from local storage or the database may be pre-stored within system 12.

In step 310, Snoop Server (DNSS) 230 of system 12 (FIG. 2) examines the Domain Name Resolution request message from PC 220 to determine if the conveyed Domain Name matches a name in database 250. In step 315, system 12 (under direction of controller 60 of FIG. 1) intercepts the Domain Name Resolution request from PC 220 (FIG. 2) if the conveyed Domain Name matches a name in database 250 (FIG. 2). Upon such a name match, system 12, in step 317, inhibits further communication of the Domain Name Resolution message to a public Internet Domain Name Server.

Snoop Server (DNSS) 230 in step 320, in conjunction with database 250, translates the intercepted Domain Name to an IP compatible address and in step 323 communicates the IP address back to the requesting source (PC 220 in this example). Further, system 12 in step 325 maintains a history of Domain Name and IP address translations and requests within database 250 and collates and compiles the information for monitoring and other purposes including, for example, parental control, firewall filtering, or for the accumulation of User preference data as a background operation. The compiled information is made available for display on a web page generated by unit 255 either continuously or upon User request via the web page. The process of FIG. 3 terminates in step 330.

In other embodiments, step 317 is not performed and system 12 also communicates the Domain Name Resolution message received from PC 220 to a public Internet Domain Name Server. In this event, system 12 may receive two IP address translations in response. One from DNSS 230 and one from a remote public Domain Name Server. The received IP addresses may or may not be the same, consequently, a potential address conflict and race condition arises. In order to prevent such a race condition from causing a problem, system 12 is programmed to select the first IP address response received. The first response received is typically the response from local DNSS 230. Alternatively, system 12 may be conditioned differently, for example, system 12 may be conditioned to give priority to responses from a particular source such as from the remote server.

The intercepting Domain Name Server and the features of the process of FIG. 3 provide a means for a User to easily and quickly allocate, add, or alter Internet domain names used in a private Internet, e.g., to accommodate the addition of devices to the private Internet. This enables a User to flexibly manage and change the configuration of elements and peripherals of a home (or other) intra-net system via a web page running on a standardized browser, for example. A User may advantageously manage Domain Name allocation on a private Internet without impact on the public Internet or the cumbersome and time consuming burden of having to register Domain Name allocations and changes with public Internet gateways and service providers (ISPs). In addition, a User requesting a web page generated within the private Internet need not know the complex IP address of this web page. Instead the User may access the web page by submitting a locally allocated private Internet Domain Name that is recognized by the Intercepting Domain Name Server as corresponding to the required web page.

The intercepting Domain Name Server and the features of the process of FIG. 3 also advantageously enable: (a) the IP addresses of the web pages generated by system 12 or of other information sources or devices on a private Internet to be dynamically assigned for security or other purposes; (b) the assignment of alias (or User customizable) Domain Names and IP addresses to an information source enabling system 12 (or a DNS server) to intercept and respond to DNS requests that are not directly addressed to it, for example; and (c) the overriding of a Domain Name with a locally allocated substitute name. Thereby, system 12 is able to communicate to a device on a LAN or subnet using a locally assigned private Internet domain name or IP address identifying the device as being on this particular LAN or subnet. The domain name or IP address may be assigned via a web page generated by unit 255 or may be assigned by the local or remote downloading of data to database 250 (FIG. 2) as previously mentioned. This eliminates the need for a User to have to adjust the IP address or netmask of a PC on the LAN in order to access the web page generated by unit 255 in system 12, for example.

Figure 4:
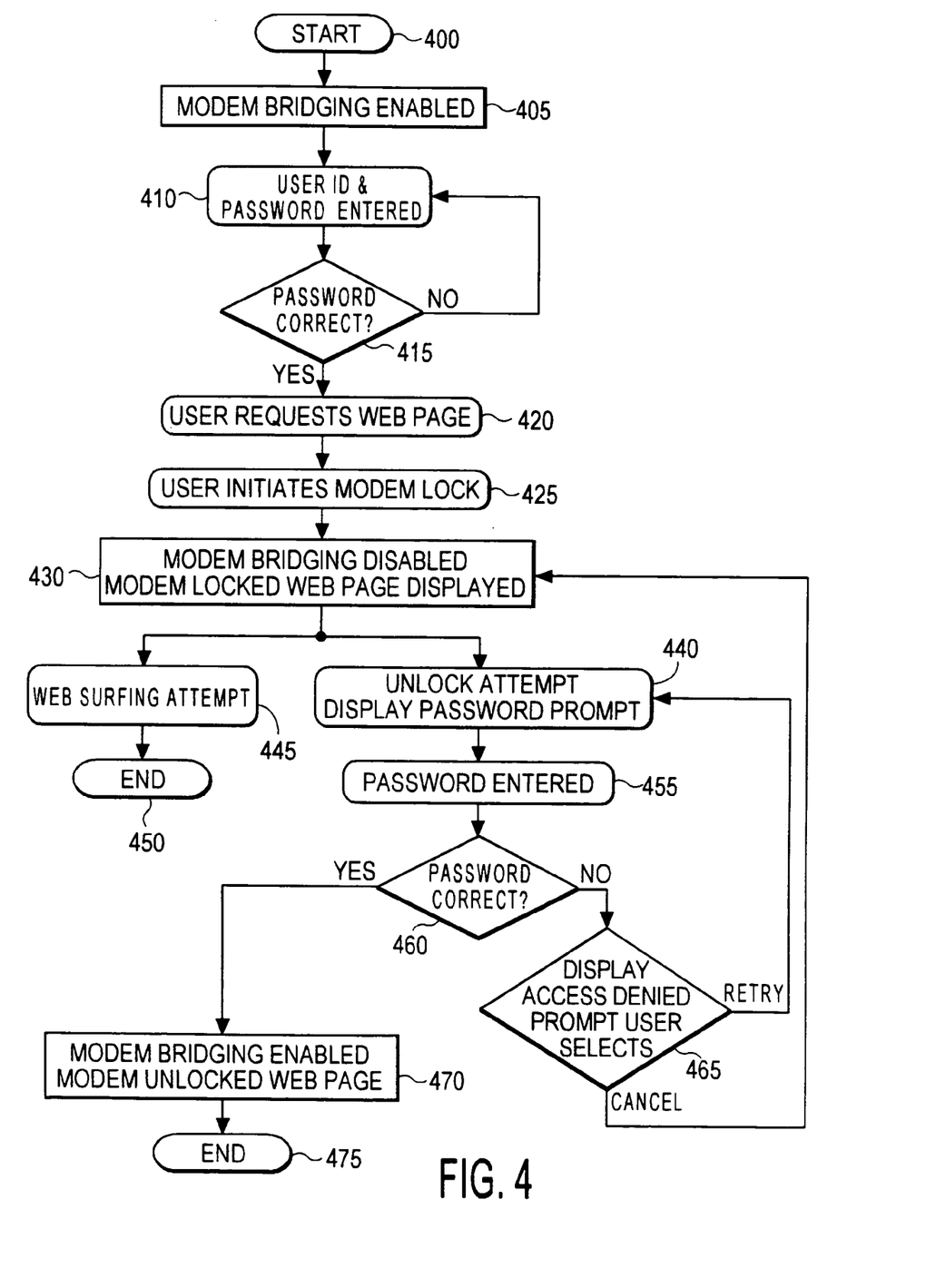
FIG. 4 shows a flowchart of a method for inhibiting and unlocking Internet access using a cable modem, according to the invention.

FIG. 4 shows a flowchart of a method for inhibiting and unlocking Internet access using a cable modem. The User interface is presented on a PC attached to Ethernet port 72. The method is employed by controller 60 of FIG. 1 (in conjunction with the other elements of system 12 of FIGS. 1 and 2) to enable secure locking of the modem to prevent unauthorized Internet access. This ensures that unauthorized users (e.g., children) will not have access to the network devices unattended. It also provides assurance to a User that his/her PC cannot be accessed while the modem is locked.

In step 405 of FIG. 4, following the start at step 400, the communication bridging capability of cable modem 12 is enabled. As previously described, this bridging capability enables an Ethernet device, e.g. a PC connected to port 72 of system 12 of FIG. 1, to connect to an RF network for communication on cable line 10 as specified under DOCSCIS standards. The DOCSIS specifications provide that a modem shall consistently range (i.e. maintain bi-directional communication) with the Cable Modem Termination System (CMTS) while connected. Therefore, in order to remove Internet connectivity, the consumer either needs to physically disconnect the modem from the RF network, or needs to remove power to the modem. The method and system described in connection with FIG. 4 provides a locking mechanism, via either hardware (i.e., lock and key) or software (i.e., username and password) to disable the modem from its bridging capability. This shields the consumer's network devices connected to the modem from exterior traffic, and also prevents unauthorized users from accessing the Internet through the modem.

Figure 9:
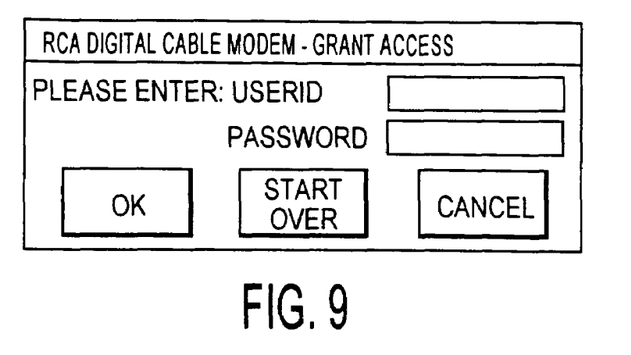
FIGS. 9-11 show User interface menus generated by the cable modem of FIG. 1 exemplifying password and userid entry for use in managing Internet access, according to the invention.
Figure 11:
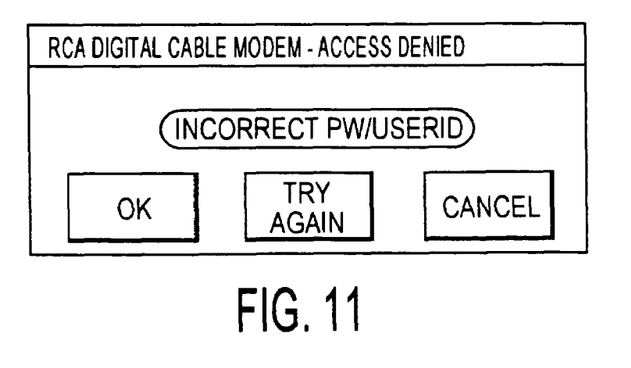

The authorization of a User to initiate locking of the modem is verified in steps 410 and 415 of FIG. 4. Specifically, a userid and password entered in step 410 is verified in step 415 using a menu exemplified in FIG. 9. This menu and other menus used in the FIG. 4 process are displayed on a PC attached to port 72 (FIG. 1). The entry of an incorrect password or userid results in steps 410 and 415 being repeated for a specified number of attempts using the incorrect password processing menu of FIG. 11 until controller 60 (FIG. 1) declares successful verification or failure.

Figure 10:
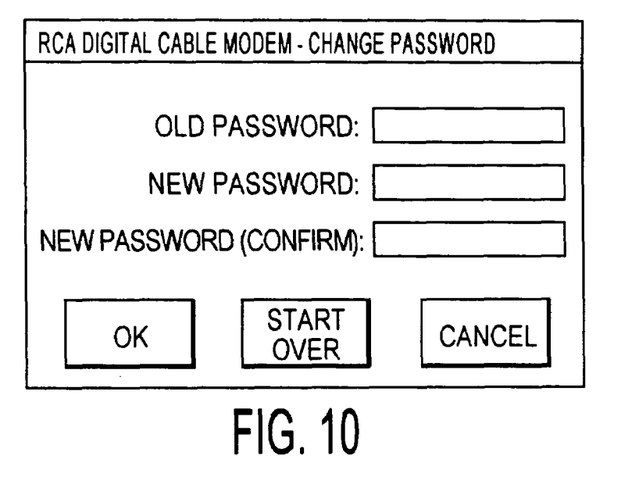

The password for the modem is changed using a change password menu as exemplified in FIG. 10. This menu may be invoked via icons 505 and 605 in the exemplary modem generated web pages of FIGS. 5 and 6 respectively. The password change menu of FIG. 10 prompts the User for the original password and the new password twice (as confirmation of the new password). A typical password may be, for example, any combination of letters, numbers, and non-alphanumeric characters up to a maximum of 10 characters. The menu of FIG. 10 or a similar menu may be used to initially set the password upon initialization of modem 12. Alternatively, a software mechanism, a MIB (Management Information Base comprising a software procedure allowing remote management) may also be used to allow the password to be reset by the head end, in the event of a lost password. A default password (e.g., "letmeout"), detailed in the User's manual, may be used to invoke the procedure for allowing a head-end to reset the password. In such a system a private MIB enabled in the modem allows a management station, operated from the cable head-end, or the network operations center controlled by an Internet service provider, to reset the password back to the default, in the event that a password is lost or forgotten. For this purpose an SNMP manager at the head-end, or the Network Operations Center, commands the MIB to reset either the User's password or userid or both password and userid. In order to invoke this procedure, a User telephones the cable operator or Network Operations Center and provides the default password as authorization to request that the password in his modem be reset. Alternatively, assuming that modem 12 is not in a locked mode and modem 12 allows bridging communication between an attached PC and the CATV head-end, then the default password may be communicated to the head-end via modem 12 to directly invoke the MIB based procedure to reset the password.

Figure 6:
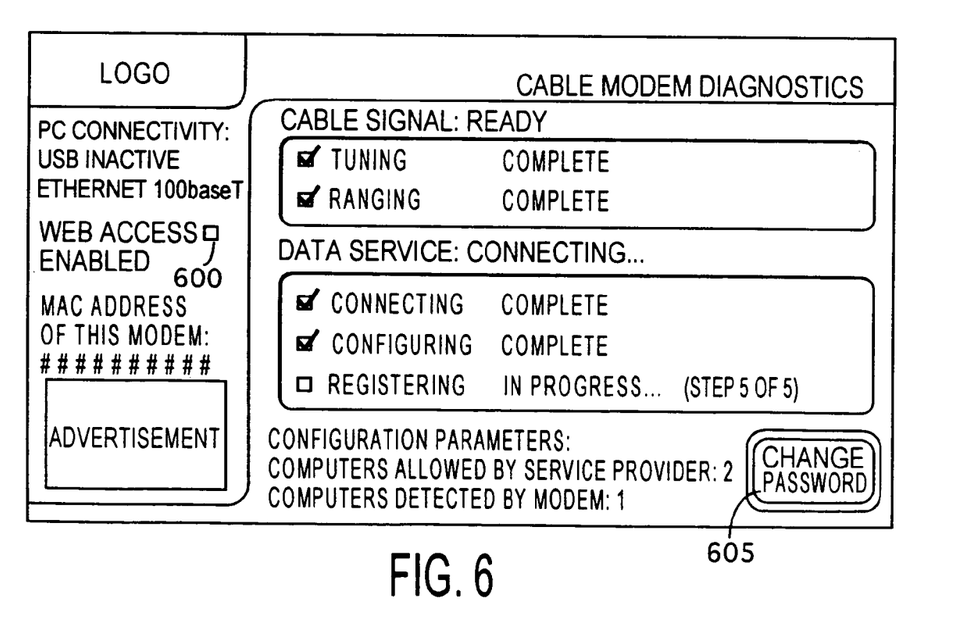
Figure 7:
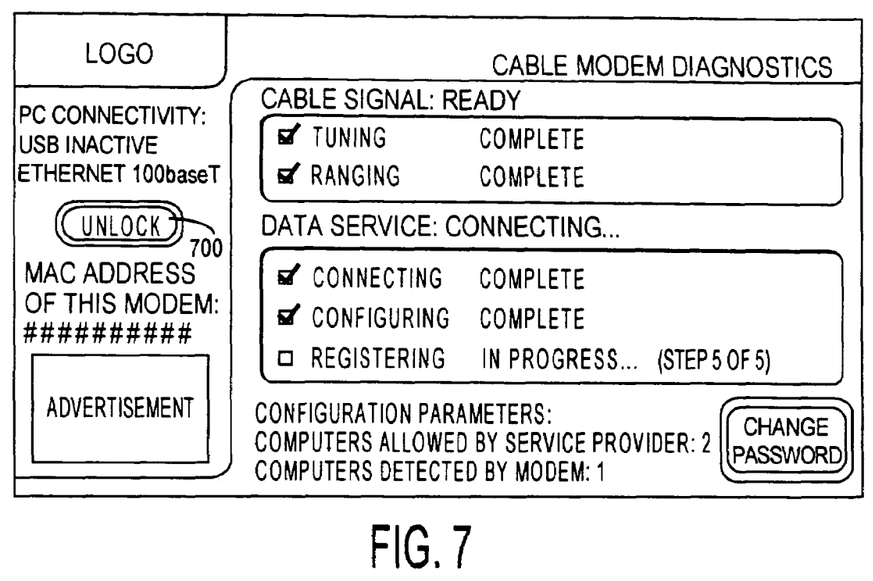

Following successful verification in step 415, a User requests display of a web page in step 420. The requested web page acts as the User interface permitting the User to lock the modem and inhibit Internet access communication. A User initiates locking and unlocking of Internet access communication of the modem in step 425 via icons 500 and 700 of the web pages of FIGS. 5 and 7 respectively. Alternatively, a User initiates unlocking and locking of Internet access communication via check boxes 600 and 800 of the web pages of FIGS. 6 and 8 respectively. A User initiates locking of the modem in step 425 via icon 500 of the web page of FIG. 5 or via a check box (e.g. as shown in icon 800 of the web page of FIG. 8). In other embodiments the functions described may be activated and inactivated using User interface menus and web pages that differ from those depicted in FIGS. 5-12.

Figure 5:
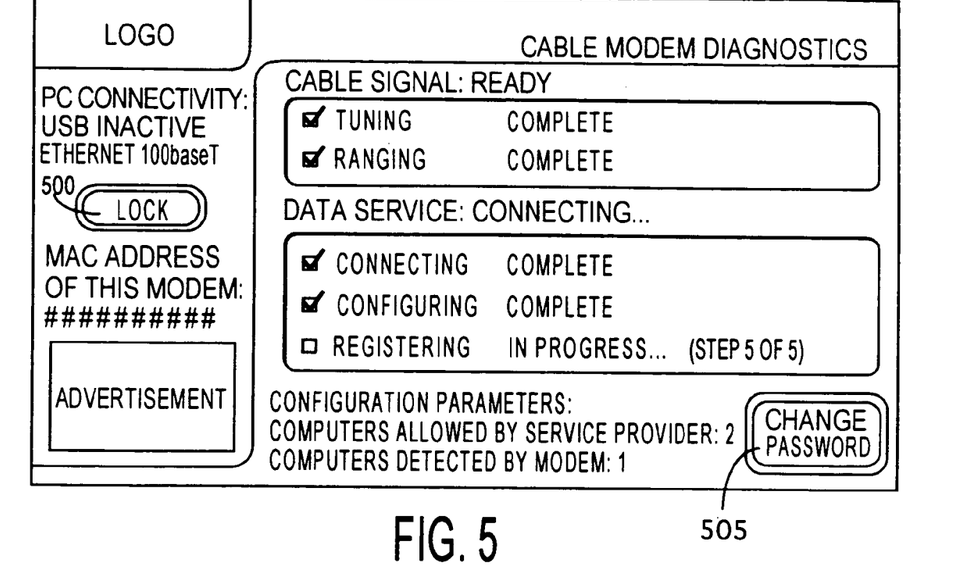
FIGS. 5-8 show web pages generated by the cable modem of FIG. 1 depicting examples of User interface menus providing the capability of locking and unlocking Internet access, according to the invention.
Figure 8:
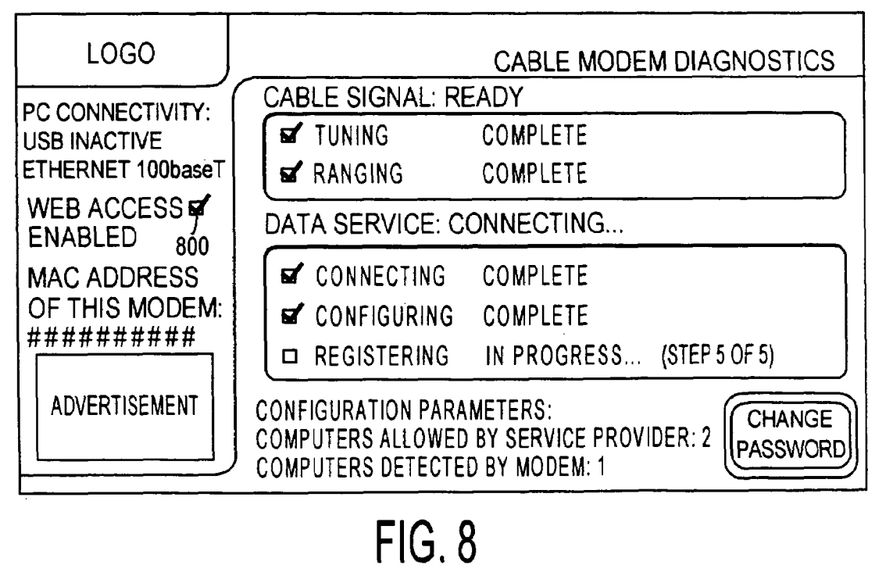

The modem 12 Internet access communication is disabled in step 430 and a web page is displayed indicating this disabled status in the manner exemplified by icons 500 and 800 of FIGS. 5 and 8 respectively. Modem 12 disables Internet access by advantageously inhibiting bridging communication of IP data between the CATV head-end and the LAN devices connected to ports 72 and 82. In the locked condition, any attempt to access the Internet that is originated by a web browser on a client device (e.g. PC 220 of FIG. 2) is limited to access to content cached on the PC itself, or to a web page generated internally by modem 12. While the modem is locked, no traffic is passed from the customer's home network, or PC (and private Internet), to the RF side of the network to the head-end and the public Internet. The bridging function of the modem is disabled.

In this locked condition, modem 12 maintains multi-layered protocol communication with the CATV head-end to support the DOCSIS standard ranging process and to support SNMP (simple network management protocol as defined in RFC 1157) access to the database (unit 250 of FIG. 2) within modem 12. The ranging communication process is initiated by the CATV head-end and is described in the DOCSIS Radio Frequency Interface Specification. The ranging communication messages comprise periodic ranging maintenance messages that are conveyed on the MAC (Media Access Control) layer of the OSI (Open Systems Interconnection) network model. The database communication involves SNMP which involves User Datagram Protocol (UDP) operating on IP at the session layer of the OSI model. In the locked mode, modem 12 also maintains multi-layered protocol communication with a PC (e.g. PC 220 of FIG. 2 attached to an Ethernet port) to provide a web page based User interface (as exemplified in FIGS. 5-8) allowing a User to unlock and re-lock the modem as required.

Modem 12 disables Internet access by advantageously inhibiting bridging communication of IP data between the CATV head-end and attached LAN devices using a filter mechanism. In this embodiment, bi-directional communication of the IP layer data is inhibited. However, in other embodiments the filter mechanism may be employed to pass data between the CATV head-end and attached LAN devices in one or more particular protocol layers whilst inhibiting communication in other protocol layers. Further, the use of bi-directional filtering permits particular protocol layers to be passed in one direction, e.g. from head-end to a LAN device, whilst one or more different layers are passed from a LAN device to the head-end. Alternatively, all bridging communication may be inhibited. The filter may be implemented as a configurable filter and used to bi-directionally filter data between the CATV head-end and attached LAN devices based on one or more of, (a) content, (b) protocol type and (c) data source or destination. The content filtering may be implemented based on metadata or other content or content derived items for a variety of specific purposes including those previously described in connection with FIG. 1.

The filter may be implemented in similar fashion to the DOCSIS Cable Device MIB as specified in RFC 2669 which defines the docsdevFilterIPDirection object and the docsDev-FilterIPDaddr object or may be implemented using other filter mechanisms. A filter using primarily these two objects may be employed to restrict all traffic, or selected traffic, from a User's web browser (e.g. on PC 220 of FIG. 2) to the head-end and further to the Internet. Upon initialization of the lock, the modem filters data traffic to restrict all inbound traffic from the browser (e.g. in PC 220) with a destination address matching the gateway IP address (corresponding to the IP address of the Cable Modem Termination System in the head-end). Alternatively, such a filter, based on the docsdev-FilterIPDirection object and the docsDevFilterIpProtocol (or based on another mechanism), may be configured to restrict any selected protocol or selected content being passed in either direction through the modem. This ensures that a User may block access to the Internet and also that access is blocked from the Internet (via the head-end) to the User's PC to enhance security.

In another embodiment, in step 430 of FIG. 4, modem 12 prevents unauthorized Internet access by inhibiting communication to the CATV head-end on the Ethernet communication protocol layer whilst concurrently maintaining communication to the CATV head-end on the MAC protocol layer. The MAC protocol layer conveys management information supporting ranging operation and other modem and network management functions. Further, modem 12 concurrently maintains multi-layered protocol communication with a PC (e.g. PC 220 of FIG. 2 attached to an Ethernet port of modem 12) to provide a web page based User interface (as exemplified in FIGS. 5-8) allowing a User to unlock and re-lock the modem as required.

Continuing with the process of FIG. 4 and following locking of the modem in step 430, any attempt by an unauthorized User, e.g., in step 445, to surf the web is blocked and results in termination of this branch of the process of FIG. 4 in step 450. Alternatively, the modem may be unlocked by an authorized User in steps 440, 455 and 460. In this case, a password prompt menu (e.g. the menu of FIG. 9) is displayed in response to a User's attempt to unlock the modem in step 440. A User may attempt to unlock the modem by either activating unlock button 700 of the web page of FIG. 7 or checking the "Web Access" checkbox 800 of FIG. 8 for example. Upon validation of a correct password in step 460, following password entry in step 455, the modem is unlocked to support bridging communication in step 470 and to provide the User with Internet access. This branch of the FIG. 4 process terminates in step 475. Upon identification of an invalid password in step 460, the User is notified that the entered password is invalid in step 465 via a menu as exemplified by FIG. 11. Through this menu, the User in step 465 may retry password validation starting with step 440 or the User may cancel the attempt to unlock the modem. If the User cancels his unlocking attempt in step 465 the processed is returned to step 430 and a web page is displayed.

In other embodiments, the authorization of a User to lock and unlock the modem to provide Internet access may be performed in other ways and need not involve the entry of a password or userid. An access card mechanism may be provided within modem 12 for use in validating authorization based on a digital signature, or other authorization or entitlement data, for example. Similarly, modem 12 may respond to a different access device such as a physical or electronic key for determining User authorization.

Figure 12:
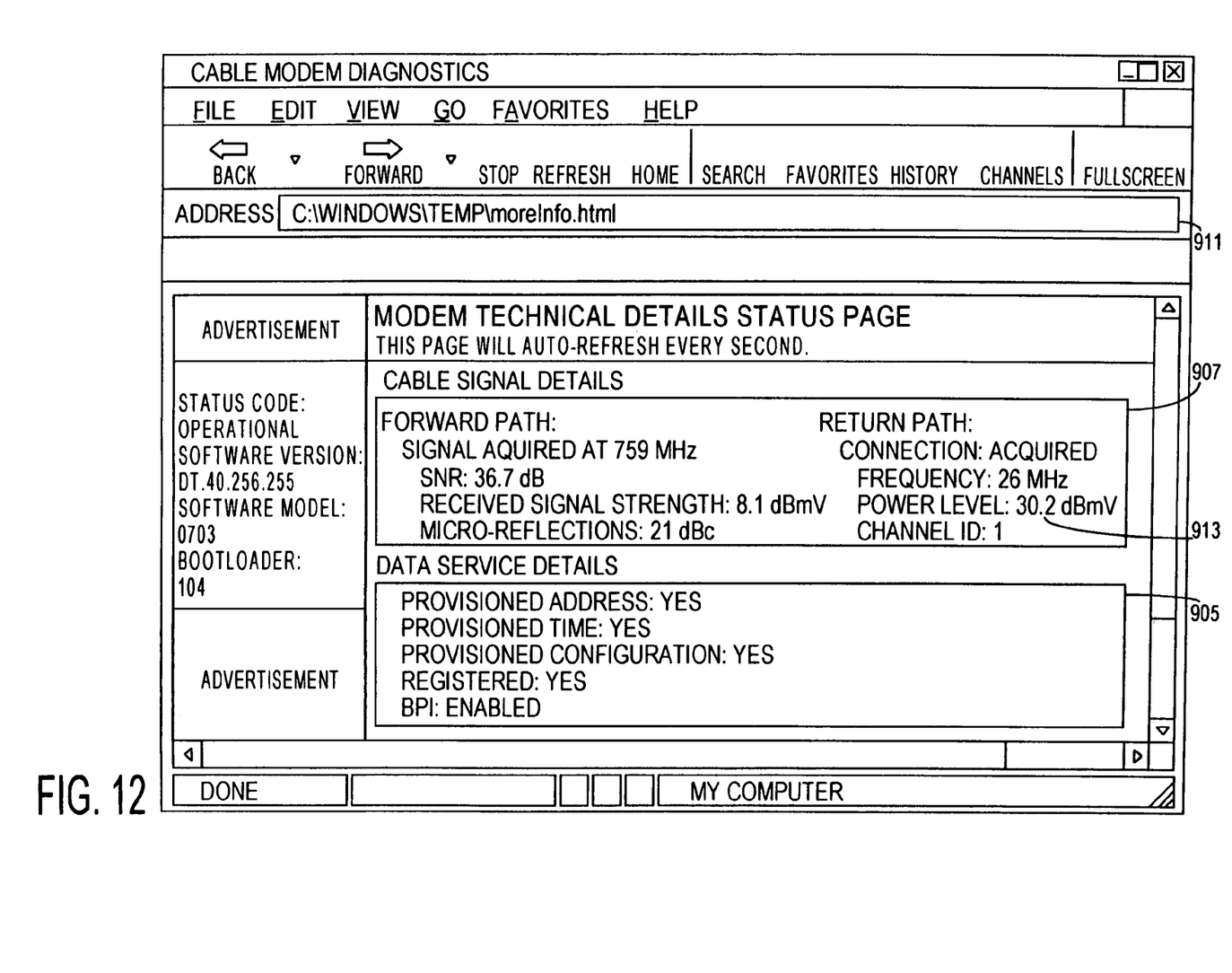
FIGS. 12 and 13 show web pages generated by the cable modem of FIG. 1, according to the invention.
Figure 13:
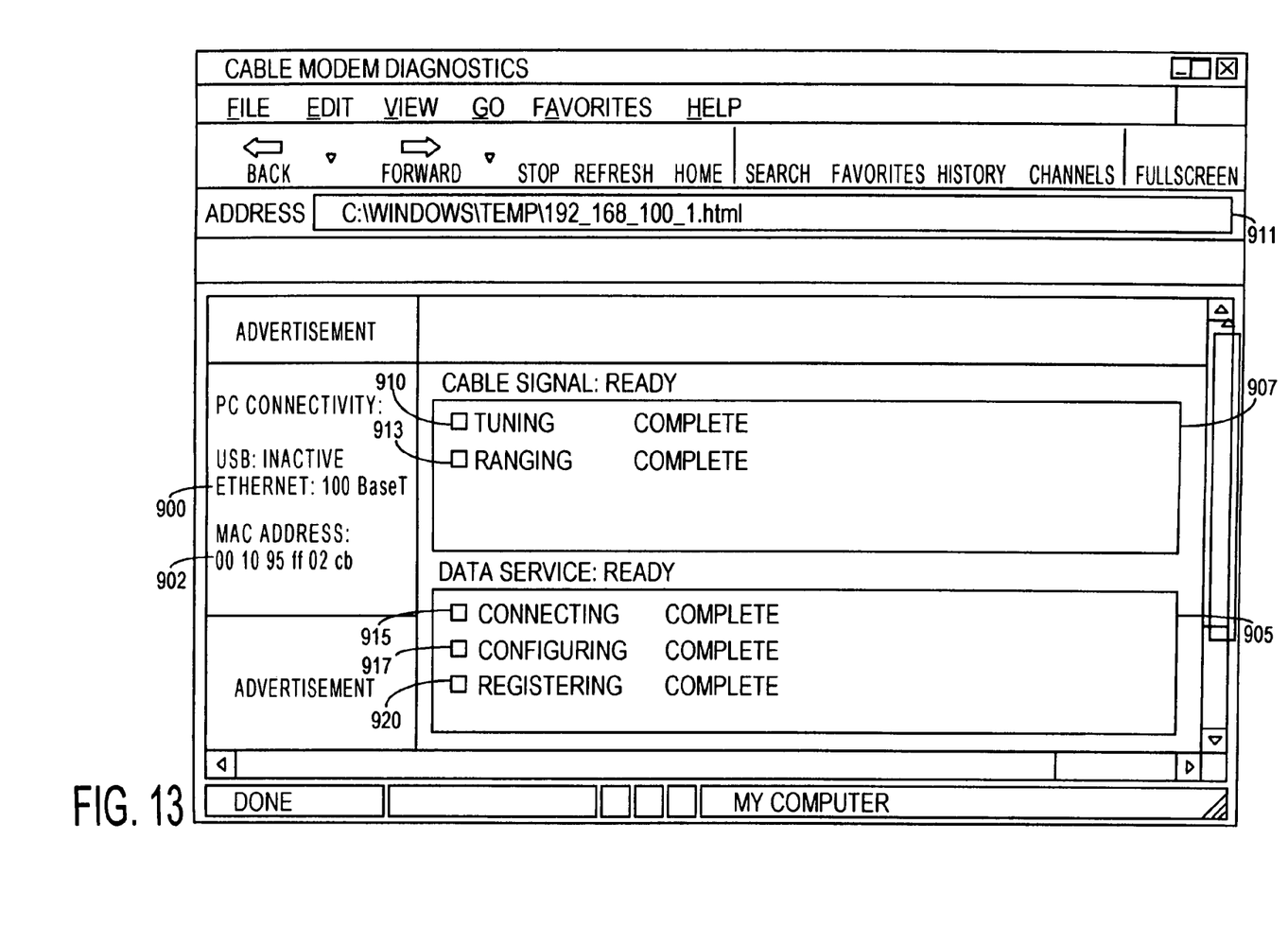

FIGS. 12 and 13 show web pages generated by the cable modem of FIG. 1. These web pages advantageously enable a technician, for example, to determine and adjust specific internal modem configurations. The web pages support interactive functions comprising one or more of, (a) configuring modem 12, (b) requesting display of system parameters, (c) selecting a service billing option, and (d) assigning Internet addresses. The web page employs password protection access similar to that previously described in connection with preventing unauthorized Internet access. Consequently, even if an unauthorized User discovers the URL address of a particular web page, it is password protected. The web page also displays specific diagnostic information to a technician thereby eliminating the need for the technician to rely on LED indications and special diagnostic equipment to be able to access internal status (e.g. items 910-920 of FIG. 13) and set configurations. Further, the use of such a web page allows a technician to use a customer's PC to access and configure modem 12 (FIG. 1) eliminating the expense involved in providing the technician with a PC or laptop, for example. A technician may set return channel power level (item 913 of FIG. 12), for example. The information available on the web page includes specific information about the customer's network configuration. Specifically, it includes the number of PCs connected to the network, the Ethernet speed (100 Mb or 10 Mb) and the MAC address of modem 12 (items 900 and 902 of FIG. 13), for example. In similar fashion, the displayed web page may indicate other address information such as (a) the web page IP address, (b) a File Transfer Protocol (FTP) address, and (c) an Email address. The web page also provides other customer network information including the amount of traffic and details concerning collisions on the network. This advantageously eliminates the need for customized diagnostic equipment or software.

Modem 12 also generates browser alert boxes for certain network events of which a User would like to be informed. Further, the browser allows special HTML information to be displayed during a retrieval of web page data. During this time period modem 12 sends information to a user concerning certain events occurring on the network. These events include alerts about unauthorized access to the User's LAN network, LAN network traffic overflow, and data transfer amounts through modem 12. Modem 12 also allows a cable Internet service provider to limit data transfer by establishing quotas and the User is also able to see the amount of data transferred. The alert boxes also allows a User to view statistics for specific types of accesses including web page retrievals, DNS requests, FTP (File Transfer Protocol) file transfers, email messages, etc. In other embodiments these events and associated information are not confined to being displayed in alert boxes on a browser but are also available on a web page generated by modem 12 in response to an on-demand User information retrieval request. The information items previously mentioned in connection with FIGS. 12 and 13 may be displayed in areas 905 and 907 of FIGS. 12 and 13, for example, or may be presented in another display format.

Further, the command line (item 911) in FIGS. 12 and 13 may be used for entry and allocation of a domain name or IP address to a peripheral (locally connected) device of modem 12. Command line 911 may also be used in associating an entered domain name with a corresponding IP address (and vice versa) involving the update of a database within modem 12. A peripheral device may comprise, (a) a device on an intra-net and (b) a device on a domestic home network, and (c) a device on a private Internet. Similarly, command line 911 provides a data entry line enabling User entry of data for configuration of a data traffic filter within modem 12. Such a traffic filter may be used for filtering data based on, (a) content rating for parental or other blocking control, (b) predetermined User preferences for targeting advertisements and "push-content", (c) firewall filtering, (d) identity of source or destination, and (e) a data search function. Alternatively, the web pages of FIGS. 12 and 13 may employ menus displayed in areas 905 and 907, for example, specifically supporting the entry, allocation and association of domain names and corresponding IP addresses. Similarly, specific menus presented in areas 905 and 907 may also be used for activating, inactivating and configuring data traffic filters.

Modem 12 also acts as a browser proxy agent for web page surfing. This increases a browser's speed of surfing the web, especially if there is more than one browser active at the same time (i.e. more than 1 PC on a customer's LAN network). Modem 12 pre-fetches and forward caches web pages associated with the web page that a user is currently viewing. This increases Internet surfing speeds by eliminating the delay caused by a remote web site or the Internet infrastructure. In addition, by configuring the internal filters previously described in connection with FIG. 4, modem 12 is used as a firewall excluding disruptive and objectionable traffic to protect a User's network system in a home or business from outside invasion and disruption.

The architectures of the systems of FIG. 1 and FIG. 2 is not exclusive. Other architectures may be derived in accordance with the principles of the invention to accomplish the same objectives. Further, the functions of the elements of modem 12 of FIGS. 1 and 2 and the process steps of FIGS. 3 and 4 may be implemented in whole or in part within the programmed instructions of controller 60. In addition, the principles of the invention apply to any multi-layered protocol bi-directional communication system and are not limited to DOCSIS compatible modems or to any other type of modem.

What is claimed is:

1. In a processing system providing Internet compatible bidirectional communication, a method for providing local access to processing system parameters for a local network, characterized by the steps of:

receiving a locally initiated User command requesting access to a web page;

validating authorization of said User command; and generating an Internet browser compatible web page for display containing a system parameter associated with said bi-directional communication in response to said validated User command, said generated web page being locally accessible via a web browser resident in said processing system, wherein said generated Internet browser compatible web page provides an interface enabled for User allocation of a domain name to a device local to said processing system;

said allocated domain name for accessing said local device is only operative In said local network;

generating an alternative Internet compatible web page for display where said alternative web page supports allocation of said specified domain name for a remote Internet web page which is associated with a web page address, wherein said specified domain name for said remote Internet web page is operative in said local network for accessing said remote Internet web page, where said remote Internet web page is capable of being accessed using the specified domain name or the web page address.

2. A method according to claim 1, wherein
said device local to said processing system comprises at least one of: (a) a device on an intra-net and (b) a device on a domestic home network, and (c) a device on a private Internet.

3. A method according to claim 1, wherein
said processing system comprises at least one of (a) a modem, (b) a phone, and (c) a processing device and said system parameter is used in controlling said processing system.

4. A method according to claim 1, wherein
said generated Internet browser compatible web page provides an interface enabling User configuration of a data traffic filter for filtering data based on at least one of, (a) content rating for parental or other blocking control, (b) predetermined User preferences for targeting advertisements and "push-content", (c) firewall filtering, (d) identity of source or destination, and (e) a data search function.

5. A method according to claim 1, wherein
said generated Internet browser compatible web page provides monitoring data associated with communication activity.

6. A method according to claim 1, wherein
said validating step comprises validating authorization of said User command using at least one of, (a) a password, (b) a userid, (e) a PIN, (d) a security code, (e) an access code, and (f) a physical key.

7. A method according to claim 1, including the step of updating said desired system parameter via said web page.

8. A method according to claim 1, including the step of providing interactive functions in said processing system via said web page, said interactive functions comprising one or more of, (a) configuring said processing system, (b) requesting display of system parameters, (c) selecting a service billing option, and (d) assigning Internet addresses.

9. A method according to claim 1, wherein
said generated Internet browser compatible web page displays a system parameter associated with said bi-directional communication comprising one or more of, (a) a diagnostic parameter, (b) billing information, (c) network status information, (d) configuration information, (e) Internet address information and (f) warning or alert information.

10. A method according to claim 1, including the step of accessing said web page using Internet Protocol communication in response to said valid User command.

11. A method according to claim 1, wherein said generated internet browser compatible web page comprises a web browser page.

12. In a processing system providing Internet compatible bidirectional communication, a method for providing local access to processing system parameters, comprising the steps of:

receiving a locally initiated User command requesting access to a web page;

validating authorization of said User command;

generating an Internet browser compatible web page supporting allocation of a domain name to a device local to said processing system, said generated web page being locally accessible via a web browser resident in said processing system;

wherein said allocated domain name for accessing said local device is only operative in said local network that operates independently of a public Internet;

generating an alternative Internet compatible web page supporting allocation of a specified domain name for a remote Internet web page which is associated with an existing web page address, wherein said specified domain name for said remote Internet web page is operative in said local network for accessing said remote Internet web page, where said remote Internet web page is capable of being accessed using the specified domain name or the web page address.

13. A method according to claim 12, wherein said generated Internet browser compatible web page supports allocation of an Internet compatible address to said device local to said processing system.

14. A method according to claim 13, wherein said Internet compatible address is one of (a) an IP address, and (b) a MAC address, (c) a File Transfer Protocol (FTP) address, and (e) an Email address and said domain name is a Universal Resource Locator (URL).

15. A method according to claim 12, including the step of associating said domain name with an IP address in a database in said processing system.

16. A method according to claim 12, wherein said domain name identifies a device local to said processing system including one or more of, (a) a device on an intra-net and (b) a device on a domestic home network, and (c) a device on a private internet.

* * * * *